(12) United States Patent
Lim

(10) Patent No.: US 10,634,831 B2
(45) Date of Patent: Apr. 28, 2020

(54) PHOTOCHROMIC GLASS

(71) Applicant: Electronics and Telecommunications Research Institute, Daejeon (KR)

(72) Inventor: Jungwook Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 169 days.

(21) Appl. No.: 15/964,251

(22) Filed: Apr. 27, 2018

(65) Prior Publication Data

US 2018/0246263 A1     Aug. 30, 2018

Related U.S. Application Data

(62) Division of application No. 14/691,289, filed on Apr. 20, 2015, now abandoned.

(30) Foreign Application Priority Data

Jun. 11, 2014   (KR) .................. 10-2014-0071003
Dec. 9, 2014    (KR) .................. 10-2014-0176133

(51) Int. Cl.
*G02B 5/23*     (2006.01)

(52) U.S. Cl.
CPC ............. *G02B 5/23* (2013.01); *Y10T 428/265* (2015.01)

(58) Field of Classification Search
CPC ........................................................ G02B 5/23
See application file for complete search history.

(56) References Cited

U.S. PATENT DOCUMENTS 3,269,267 A   8/1966   Collins
5,306,547 A   4/1994   Hood et al.
(Continued)

FOREIGN PATENT DOCUMENTS

KR   10-20130013225 A   2/2013

OTHER PUBLICATIONS

Weiwei Geng, et al., "A multi-responsive diarylethene system based on the structure transformation by chemical and light stimuli", Journal of Photochemistry and Photobiology A: Chemistry, vol. 282, pp. 47-52, Mar. 21, 2014.
(Continued)

*Primary Examiner* — David Sample
(74) *Attorney, Agent, or Firm* — Rabin & Berdo, P.C.

(57) ABSTRACT

Provided is photochromic glass. The photochromic glass includes a photochromic layer having visible-light transmittance decreased at short-wavelength light and having visible-light transmittance increased at long-wavelength light, a short-wavelength transmission layer provided on a surface of the photochromic layer to transmit only the short-wavelength light among lights entering the photochromic layer, and a wavelength conversion layer provided on another surface of the photochromic layer opposite to the surface to convert a wavelength of light entering the photochromic layer into a long wavelength, or a long-wavelength transmission layer transmitting only the long-wavelength among lights entering the photochromic layer. The visible-light transmittance of the photochromic layer may adjust on both surfaces of the photochromic layer through the incident direction of light. It is possible to implement various colors according to the photochromic layer and further provide a heat insulation function due to the blocking of an infrared ray of the short-wavelength transmission layer.

8 Claims, 5 Drawing Sheets

(56) References Cited

U.S. PATENT DOCUMENTS

| | | | |
|---|---|---|---|
| 5,332,618 | A | 7/1994 | Austin |
| 2005/0136260 | A1 | 6/2005 | Garcia |
| 2006/0256428 | A1 | 11/2006 | Kochergin et al. |
| 2013/0286461 | A1 | 10/2013 | Broekhuis et al. |
| 2014/0002881 | A1 | 1/2014 | Kim |
| 2014/0042475 | A1 | 2/2014 | Park et al. |
| 2014/0063582 | A1 | 3/2014 | Gross et al. |
| 2014/0124715 | A1 | 5/2014 | Ofir et al. |
| 2014/0220352 | A1 * | 8/2014 | Gross ............... B32B 27/20 428/411.1 |

OTHER PUBLICATIONS

Xiaoting Li, et al., "Photochromism of novel isomeric diarylethenes with benzofuran and pyridine moieties", Dyes and Pigments, vol. 105, pp. 47-56, Feb. 1, 2014.

Karkare, "Estimation of Band Gap and Particle size of TiO2 nanoparticle synthesized using Sol gel technique," 2014 International Conference on Advances in Communication and Computing Technologies. (Year: 2014).

Low et al., "Band Gap Energy in Silicon," American Journal of Undergraduate Research, vol. 7, No. 1, pp. 27-32, 2007. (Year: 2007).

\* cited by examiner

PHOTOCHROMIC GLASS

CROSS-REFERENCE TO RELATED APPLICATIONS

This is a divisional application of U.S. patent application Ser. No. 14/691,289, filed on Apr. 20, 2015. Further, this patent application claims priority under 35 U.S.C. § 119 to Korean Patent Application Nos. 10-2014-0071003, filed on Jun. 11, 2014, and 10-2014-0176133, filed on Dec. 9, 2014. The entire contents of these prior U.S. and Korean applications are hereby incorporated by reference.

BACKGROUND OF THE INVENTION

The present invention disclosed herein relates to photochromic glass, and more particularly, to photochromic glass switched due to the selective irradiation of light.

Most of functional windows used today use an electrochromic device having a transmittance varying depending on an applied voltage. Since a general electro-chromic device uses electrolyte, there are limitations in that it is difficult to apply to windows and doors and in stability and response time. Thus, when light having a particular wavelength is irradiated, a change in a molecular structure occurs and thus there is a need to develop a photochromic device showing a characteristic that the transmittance of a visible light decreases. A photochromic layer for the photochromic device is an organic material and causes a photochromic phenomenon in reaction to an ultraviolet ray. Also, an organic dye is being developed which ensures stability at room temperature and thus maintains a photochromic state before light having another wavelength is applied.

SUMMARY OF THE INVENTION

The present invention provides photochromic glass having an optical switching function.

Tasks to be performed by the present invention are not limited to the above-mentioned tasks and other tasks not mentioned may be clearly understood by a person skilled in the art from the following descriptions.

Embodiments of the present invention provide photochromic glass including: a photochromic layer; a short-wavelength transmission layer disposed on a first surface of the photo-chromic layer and having higher transmittance on short-wavelength light than long-wavelength light; and a wavelength conversion layer disposed on a second surface opposite to the first surface of the photo-chromic layer, and converting the short-wavelength light into long-wavelength light.

In some embodiments, the photochromic layer may have visible-light absorbance increased when an ultraviolet ray is irradiated, and have transmittance increased when a near infrared ray is irradiated In other embodiments, the photo-chromic layer may include azobenzene, spiro-naphtoxazine, naphtopyran, spiropyran, furylfulgide, stilbene, nitron, fulgide, triarylmethane, diarylethene, $MoO_x$ or $WO_x$.

In still other embodiments, the short-wavelength transmission layer may have a thickness smaller than about 500 nm and include a transparent electrode material selected from ITO, ZnO:Al, ZnO:Ga, ZnO:B, $SnO_2$, ZnO, $TiO_2$ and $V_2O_5$.

In even other embodiments, the short-wavelength transmission layer may be a multi-layer photofunctional thin film that has a thickness smaller than about 500 nm and includes a dielectric and ultra-thin film. The dielectric may be selected from ITO, ZnO:Al, ZnO:Ga, ZnO:B, $SnO_2$, ZnO, $TiO_2$ or $V_2O_5$. The ultra-thin metal may be selected from silver (Ag), copper (Cu), aluminum (Al), gold (Au), platinum (Pt), zinc (Zn), chromium (Cr) and molybdenum (Mo).

In yet other embodiments, the wavelength conversion layer may include an organic dye, a lanthanide-based inorganic thin film, $TiO_x$ or $ZnO_x$.

In other embodiments of the present invention, photochromic glass includes a photochromic layer; a short-wavelength transmission layer disposed on a first surface of the photo-chromic layer and having higher transmittance on short-wavelength light than long-wavelength light; and a long-wavelength transmission layer disposed on a second surface opposite to the first surface of the photo-chromic layer, absorbing and blocking the short-wavelength light.

In some embodiments, the photochromic layer may have visible-light absorbance increased when an ultraviolet ray is irradiated, and have transmittance increased when a near infrared ray is irradiated.

In other embodiments, the photo-chromic layer may include azobenzene, spiro-naphtoxazine, naphtopyran, spiropyran, furylfulgide, stilbene, nitron, fulgide, triarylmethane, diarylethene, $MoO_x$, or $WO_x$.

In still other embodiments the short-wavelength transmission layer may have a thickness smaller than about 500 nm and include a transparent electrode material selected from ITO, ZnO:Al, ZnO:Ga, ZnO:B, $SnO_2$, ZnO, $TiO_2$ and $V_2O_5$.

In even other embodiments, the short-wavelength transmission layer may be a multi-layer photofunctional thin film that has a thickness smaller than about 500 nm and includes a dielectric and ultra-thin film. The dielectric may be selected from ITO, ZnO:Al, ZnO:Ga, ZnO:B, $SnO_2$, ZnO, $TiO_2$ or $V_2O_5$. The ultra-thin metal may be selected from silver (Ag), copper (Cu), aluminum (Al), gold (Au), platinum (Pt), zinc (Zn), chromium (Cr) and molybdenum (Mo).

In yet other embodiments, the long-wavelength transmission layer may include a light absorbing material having a band gap of about 1.5 eV to about 2.5 eV. The light absorbing material may include amorphous silicon, microcrystalline silicon, amorphous silicon-germanium, CIGS, CdTe, GaAs, INP, SiC, SiN or SiO.

In further embodiments, the long-wavelength transmission layer may further include a dielectric selected from ITO, ZnO:Al, ZnO:Ga, SnO2, ZnO, $TiO_2$, $Al_2O_3$, $SiO_2$ and $ZrO_2$.

In still further embodiments, the long-wavelength transmission layer may be an inorganic thin film having a thickness of about 20 nm to about 500 nm.

BRIEF DESCRIPTION OF THE DRAWINGS

In order to help a more perfect understanding of the present invention, reference is provided along with the accompanying drawings and reference numerals are represented below.

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
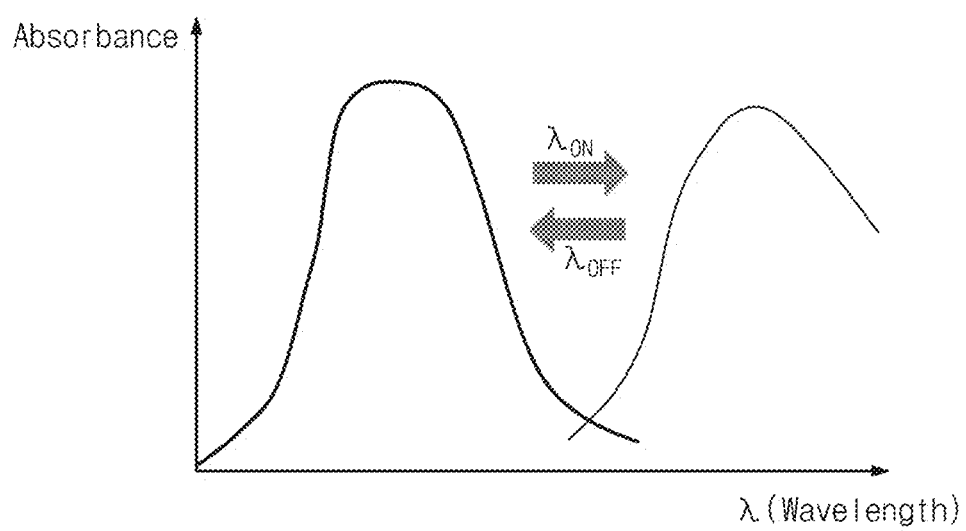
FIG. 1 is a graph representing the characteristic of a photochromic layer according to embodiments of the present invention.

In order for readers to sufficiently understand the configuration and effect of the present invention, exemplary embodiments of the present invention are described with reference to the accompanying drawings. The present invention may, however, be embodied in different forms and should not be construed as limited to the embodiments set forth herein. The embodiments are provided to make the disclosure of the present invention complete and completely inform a person skilled in the art of the scope of the present invention. A person skilled in the art will be able to understand that the concepts of the present invention may be performed in any suitable environments.

The terms used herein are only for explaining embodiments and not intended to limit the present invention. The terms in a singular form in the disclosure also includes plural forms unless otherwise specified. The terms used herein "comprises" and/or "comprising" do not exclude the presence or addition of one or more additional components, steps, operations and/or elements other than the components, steps, operations and/or elements that are mentioned.

In the specification, when a surface (or layer) is referred to as being 'on' another surface (or layer) or substrate, it can be directly on the other surface (or layer) or substrate, or a third surface (or layer) may also be present therebetween.

Though terms such as first, second, and third are used to describe various regions and surfaces (or layers) in various embodiments of the present invention, the regions and the surfaces are not limited to these terms. These terms are used only to distinguish a certain region or surface (or layer) from another region or surface (or layer). Thus, a surface referred to as a first surface in an embodiment may also be referred to as a second surface in another embodiment. Each embodiment described and illustrated herein includes its complementary embodiment. The same reference numerals represent the same components throughout the disclosure.

Terms used in embodiments of the present invention may be construed as meanings typically known to a person skilled in the art unless being defined otherwise.

Exemplary embodiments of the present invention are described below in detail with reference to the accompanying drawings.

The concept of the present invention relates to photochromic glass having transmittance controlled by light. The photochromic glass according to embodiments of the present invention includes a photochromic layer, which is inserted between two layers that transmit light having opposite wavelengths (e.g., ultraviolet and near infrared rays).

FIG. 1 is a graph representing the characteristic of a photochromic layer according to embodiments of the present invention.

Referring to FIG. 1, the photochromic layer has a photochromic characteristic in which the absorbance of a visible light increases when short-wavelength light $\lambda_{on}$ (e.g., ultraviolet ray) is irradiated, and transmittance increase when long-wavelength light $\lambda_{off}$ (e.g., near infrared ray) is irradiated. For example, when the short-wavelength light $\lambda_{on}$ is irradiated to the photochromic layer, the absorbance of the visible light increases. Even if the short-wavelength light $\lambda_{on}$ irradiated to the photochromic layer is removed, the absorbance of the visible light is maintained in an increased state. When the long-wavelength light $\lambda_{off}$ is irradiated to the photochromic layer, the transmittance of the visible light increases. Even if the long-wavelength light $\lambda_{off}$ irradiated to the photochromic layer is removed, the transmittance of the visible light is maintained in an increased state.

The photochromic layer may include an organic material having a photochromic characteristic. For example, the photochromic layer may be azobenzene, spiro-naphtoxazine, naphtopyran, spiropyran, furylfulgide, stilbene, nitron, fulgide, triarylmethane, or diarylethene. Alternatively, the photochromic layer may be an inorganic oxide. For example, the photochromic layer may include $MoO_x$ or $WO_x$.

Figure 2:
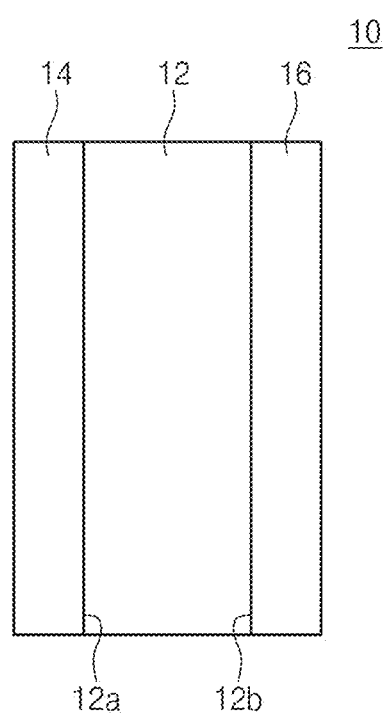
FIG. 2 is a cross-sectional view of photochromic glass according to an embodiment of the present invention.

FIG. 2 is a cross-sectional view of photochromic glass according to an embodiment of the present invention.

Referring to FIG. 2, photochromic glass 10 according to an embodiment of the present invention may include a short-wavelength transmission layer 14, a photochromic layer 12, and a wavelength conversion layer 16.

The photochromic layer 12 includes the photochromic layer as described with reference to FIG. 1. The photochromic layer 12 has a first surface 12a and a second surface 12b opposite thereto.

Figure 3:
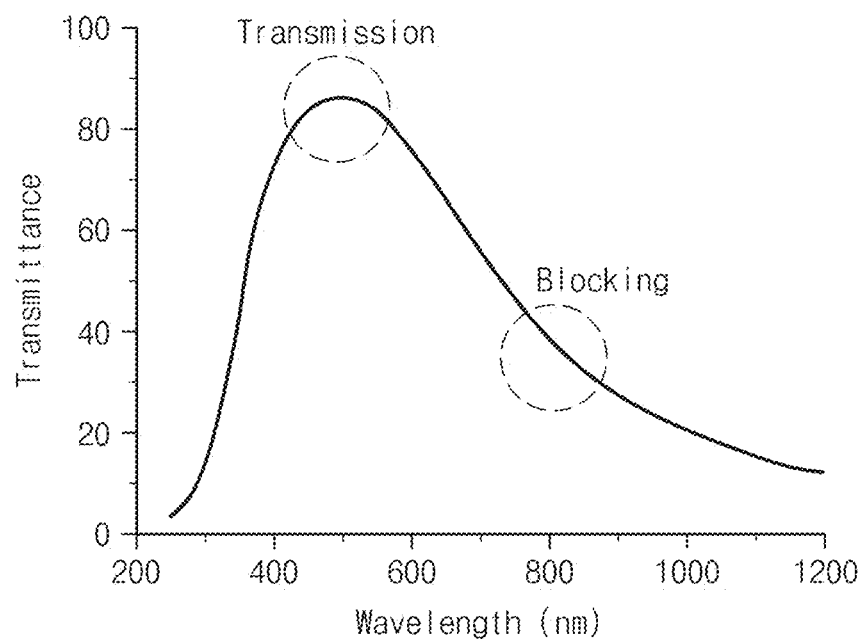
FIG. 3 is a transmittance change graph according to a wavelength of a short-wavelength transmission layer according to an embodiment of the present invention.

The short-wavelength transmission layer 14 is formed on the first surface 12a of the photochromic layer 12. FIG. 3 is a graph representing a transmittance change according to the wavelength of the short-wavelength transmission layer 14. Referring to FIG. 3, the short-wavelength transmission layer 14 may have high transmittance at a short wavelength. The short-wavelength transmission layer 14 may reflect or absorb long-wavelength light to have low transmittance at a long wavelength. For example, the transmittance at a long-wavelength of about 700 nm or longer may be significantly low, e.g., 50% or lower. The short-wavelength transmission layer 14 may have directivity. For example, the short-wavelength transmission layer 14 may vary in transmittance or reflectance according to the incident direction of light.

The short-wavelength transmission layer 14 may include a transparent electrode material having a thickness smaller than about 500 nm. For example, the transparent electrode material may include ITO, ZnO:Al, ZnO:Ga, ZnO:B, $SnO_2$, ZnO, $TiO_2$ or $V_2O_5$. The short-wavelength transmission layer 14 may be a multi-layer photofunctional thin film having a thickness smaller than about 500 nm. The multi-layer photofunctional thin film may include a dielectric or ultra-thin metal. For example, the dielectric may include ITO, ZnO:Al, ZnO:Ga, ZnO:B, $SnO_2$, ZnO, $TiO_2$ or $V_2O_5$. For example, the ultra-thin metal may include silver (Ag), copper (Cu), aluminum (Al), gold (Au), platinum (Pt), zinc (Zn), chromium (Cr) or molybdenum (Mo).

Since the short-wavelength transmission layer 14 is disposed on the first surface 12a of the photochromic layer 12, only the short-wavelength light $\lambda_{on}$ among natural lights is irradiated to the photochromic layer 12 through the first surface 12a of the photochromic layer 12. The short-wavelength transmission layer 14 functions as a switch lowering the transmittance of a visible light of the photochromic layer 12.

Figure 4:
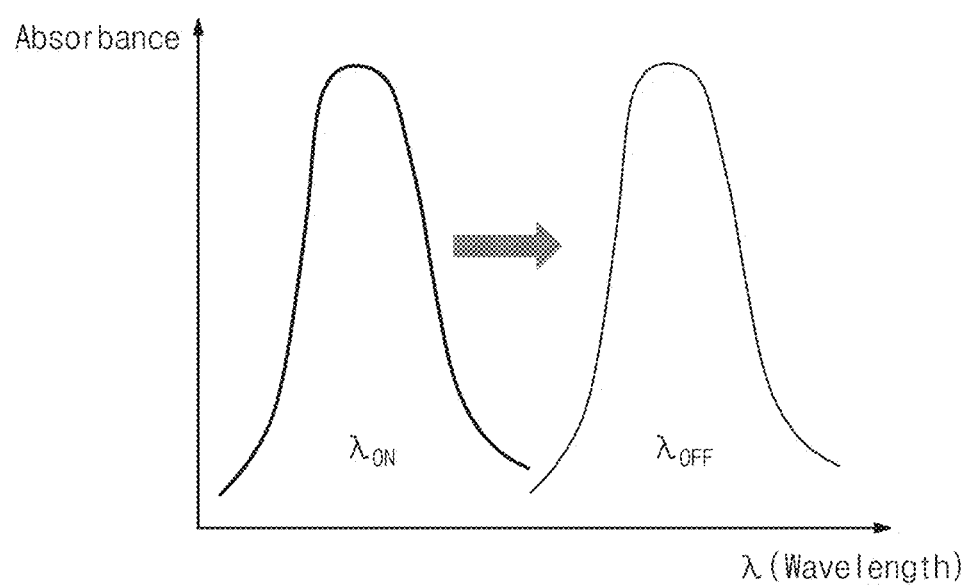
FIG. 4 is a wavelength conversion characteristic graph according to a wavelength of a wavelength conversion layer according to an embodiment of the present invention.

The wavelength conversion layer 16 is formed on the second surface 12b of the photochromic layer 12. FIG. 4 is a graph representing a wavelength conversion characteristic according to the wavelength of the wavelength conversion layer 16. Referring to FIG. 4, the wavelength conversion layer 16 converts the short-wavelength light into the long-wavelength light $\lambda_{off}$. The wavelength conversion layer 16 transmits the long-wavelength light $\lambda_{off}$ and converts the short-wavelength light $\lambda_{on}$ into the long-wavelength light.

The wavelength conversion layer 16 may include an organic dye, a lanthanide-based inorganic thin film, $TiO_x$ or $ZnO_x$. For example, the organic dye may be selected from metal oxinoid compounds, stilbene compounds, anthracine compounds, oxadiazole metal chelate compounds, polyfluorenes, polyphenylenevinylenes and mixtures thereof. For example, the lanthanide-based inorganic thin film may be a compound including a lanthanide cation, and a derivative thereof.

Since the wavelength conversion layer 16 is disposed on the second surface 12b of the photochromic layer 12, only the long-wavelength light $\lambda_{on}$ among natural lights is irradiated to the photochromic layer 12 through the second surface 12b of the photochromic layer 12. The wavelength conversion layer 16 functions as a switch increasing the transmittance of the visible light of the photochromic layer 12.

Figure 5:
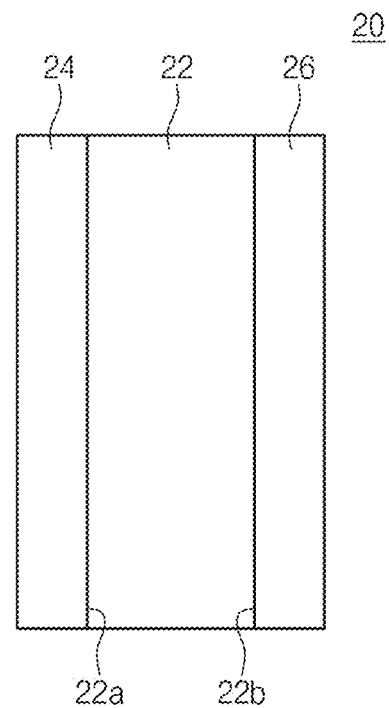
FIG. 5 is a cross-sectional view of photochromic glass according to another embodiment of the present invention.

FIG. 5 is a cross-sectional view of photochromic glass 20 according to another embodiment of the present invention.

Referring to FIG. 5, the photochromic glass 20 according to another embodiment of the present invention may include a short-wavelength transmission layer 24, a photochromic layer 22, and a long-wavelength transmission layer 26.

The photochromic layer 22 may be the photochromic layer as described with reference to FIG. 1. The photochromic layer 22 has a first surface 22a and a second surface 22b opposite thereto.

The short-wavelength transmission layer 24 is formed on the first surface 22a of the photochromic layer 22. The short-wavelength transmission layer 24 may reflect or absorb the long wavelength light to have low transmittance at a long wavelength, as described with reference to FIG. 3. The short-wavelength transmission layer 24 may have directivity. For example, the short-wavelength transmission layer 24 may vary in transmittance or reflectance according to the incident direction of light.

The short-wavelength transmission layer 24 may include a transparent electrode material having a thickness smaller than about 500 nm. For example, the transparent electrode material may include ITO, ZnO:Al, ZnO:Ga, ZnO:B, $SnO_2$, ZnO, $TiO_2$ or $V_2O_5$. The short-wavelength transmission layer 24 may be a multi-layer photofunctional thin film having a thickness smaller than about 500 nm. The multi-layer photofunctional thin film may include a dielectric or ultra-thin metal. For example, the dielectric may include ITO, ZnO:Al, ZnO:Ga, ZnO:B, $SnO_2$, ZnO, $TiO_2$ or $V_2O_5$. For example, the ultra-thin metal may include silver (Ag), copper (Cu), aluminum (Al), gold (Au), platinum (Pt), zinc (Zn), chromium (Cr) or molybdenum (Mo).

Since the short-wavelength transmission layer 24 is disposed on the first surface 22a of the photochromic layer 22, only the short-wavelength light $\lambda_{on}$ among natural lights is irradiated to the photochromic layer 22 through the first surface 22a of the photochromic layer 22. The short-wavelength transmission layer 24 functions as a switch lowering the transmittance of a visible light of the photochromic layer 22.

Figure 6:
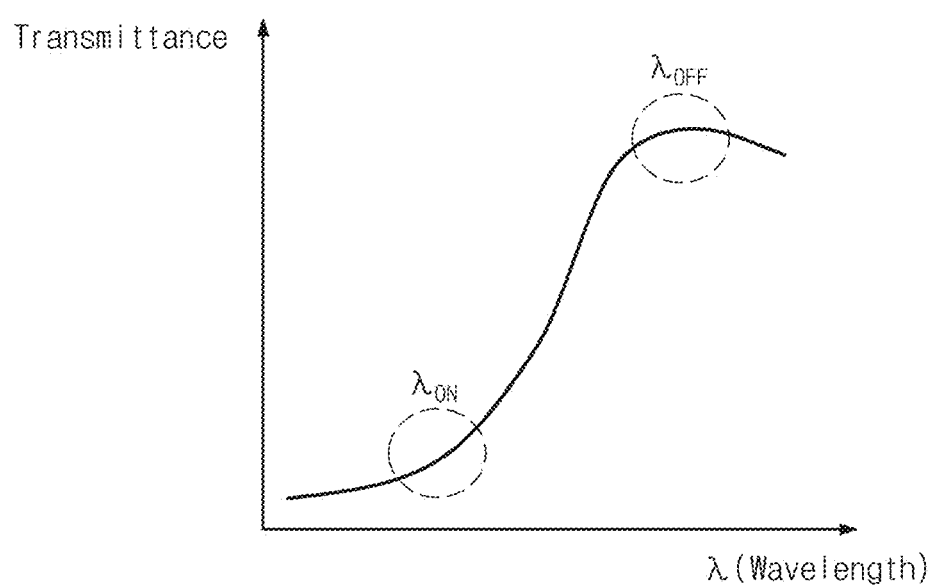
FIG. 6 is a transmittance change graph according to a wavelength of a long-wavelength transmission layer according to another embodiment of the present invention.

The long-wavelength transmission layer 26 is formed on the second surface 22b of the photochromic layer 20. FIG. 6 is a graph representing a transmittance change according to the wavelength of the long-wavelength transmission layer 26. Referring to FIG. 6, the long-wavelength transmission layer 26 absorbs the short-wavelength light $\lambda_{on}$. The long-wavelength transmission layer 26 may have directivity. For example, the long-wavelength transmission layer 26 may vary in transmittance or reflectance according to the incident direction of light.

The long-wavelength transmission layer 26 may be an inorganic thin film having a thickness of about 20 nm to about 500 nm. The inorganic thin film may be formed on a light absorbing material having a band gap of about 1.5 eV to about 2.5 eV. For example, the light absorbing material may include amorphous silicon, micro-crystalline silicon, amorphous silicon-germanium, CIGS, CdTe, GaAs, INP, SiC, SiN and SiO. The long-wavelength transmission layer 26 may further include a dielectric. For example, the dielectric may include ITO, ZnO:Al, ZnO:Ga, $SnO_2$, ZnO, $TiO_2$, $Al_2O_3$, $SiO_2$ or $ZrO_2$.

Since the long-wavelength transmission layer 26 is disposed on the second surface 22b of the photochromic layer 22, the short-wavelength light $\lambda_{on}$ is absorbed and thus not transmitted and the long-wavelength light λon is transmitted. Only the long-wavelength light $\lambda_{on}$ is irradiated to the photochromic layer 22 through the second surface 22b of the photochromic layer 22. The long-wavelength transmission layer 26 functions as a switch increasing the transmittance of the visible light of the photochromic layer 22.

The photochromic layers 12 and 22 according to embodiments of the present invention may implement various colors according to the photochromic layer.

The short-wavelength transmission layers 14 and 24 according to embodiments of the present invention may perform less heat emission. In other words, the short-wavelength transmission layers 14 and 24 may enhance heat insulation efficiency by blocking infrared rays.

In embodiments of the present invention, the photochromic glass may be used for sunglasses. The photochromic glass on the sunglasses may be disposed so that the short-wavelength transmission layers 14 and 24 face an outward direction and the wavelength conversion layer 16 or long-wavelength transmission layer 26 faces an inward direction.

Figure 7:
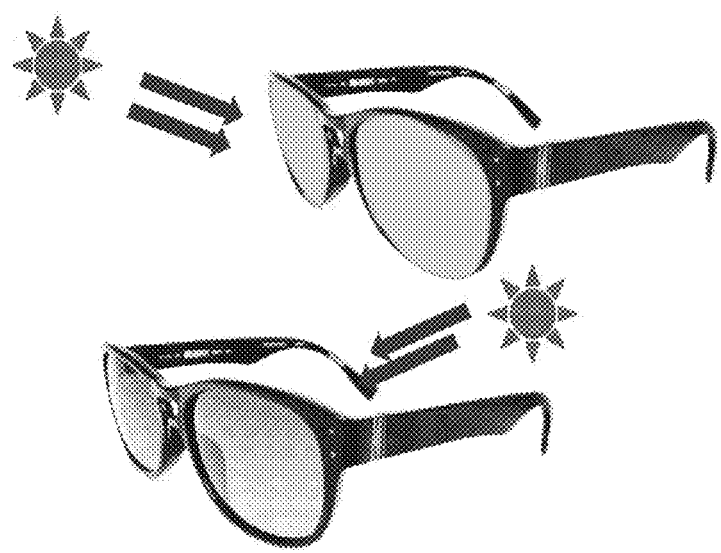
FIG. 7 is a diagram representing the coloring and decoloring principles of photo switchable photochromic sunglasses according to embodiments of the present invention.

FIG. 7 is a diagram representing the coloring and decoloring principles of photo switchable photochromic sunglasses according to embodiments of the present invention. Referring to FIG. 7, when a sun light is externally irradiated to sunglasses having high visible-light transmittance, only the short-wavelength light $\lambda_{on}$ is irradiated to the photochromic layers 12 and 22 by the short-wavelength transmission layers 14 and 24. Thus, the transmittance of the visible light of the photochromic layers 12 and 22 decreases and the sunglasses are maintained in a colored state. When light is irradiated to the internal surfaces of colored sunglasses for conversion into a decoloring state, only the long-wavelength light $\lambda_{off}$ is irradiated to the photochromic layers 12 and 22 by the wavelength conversion layer 16 or long-wavelength transmission layer 26. Thus, the transmittance of the visible light of the photochromic layers 12 and 22 increases and the sunglasses returns to a state having high transmittance.

In embodiments of the present invention, the photochromic glass may be used for photochromic windows and doors for a building. The photochromic glass on the building's windows and doors is disposed so that the short-wavelength transmission layers 14 and 24 face an outdoor direction and the wavelength conversion layer 16 or long-wavelength transmission layer 26 faces an indoor direction.

Figure 8:
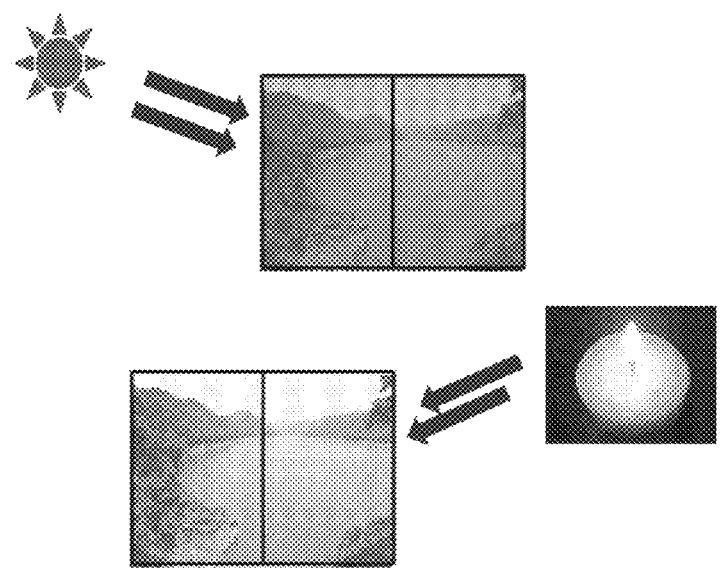
FIG. 8 is a diagram representing the coloring and decoloring principles of photo switchable photochromic windows and doors for a building according to embodiments of the present invention.

FIG. 8 is a diagram representing the coloring and decoloring principles of photo switchable photochromic windows and doors for a building according to embodiments of the present invention. Referring to FIG. 8, when a sun light is irradiated from the outsides of the photo switchable photochromic windows and doors for the building, only the short-wavelength light $\lambda_{on}$ is irradiated to the photochromic layers 12 and 22 by the short-wavelength transmission layers 14 and 24. Thus, the transmittance of the visible light of the photochromic layers 12 and 22 decreases, and the photo switchable photochromic windows and doors for the building block the sun light from the outside to function as a sunblind. When indoor light is irradiated to the photo switchable photochromic windows and doors for the building, only the long-wavelength light $\lambda_{off}$ is irradiated to the photochromic layers 12 and 22 by the wavelength conversion layer 16 or long-wavelength transmission layer 26. Thus, the transmittance of the visible light of the photochromic layers 12 and 22 increases and the photo switchable photochromic windows and doors for the building returns to a decolored state.

In embodiments of the present invention, the photochromic glass may be used for photochromic windows and doors for a car. The photochromic glass on the car's windows and doors is disposed so that the short-wavelength transmission layers 14 and 24 face an outdoor direction and the wavelength conversion layer 16 or long-wavelength transmission layer 26 faces an indoor direction.

Figure 9:
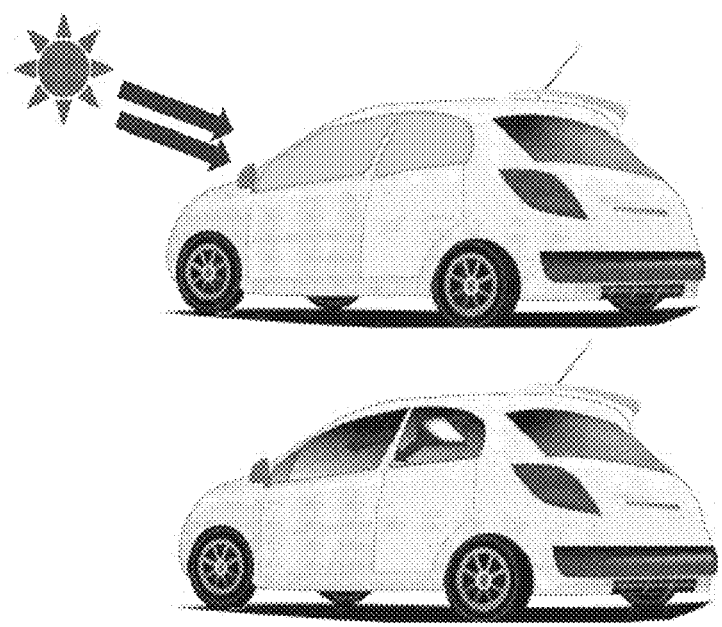
FIG. 9 is a diagram representing the coloring and decoloring principles of photo switchable photochromic windows and doors for a car according to embodiments of the present invention.

FIG. 9 is a diagram representing the coloring and decoloring principles of photo switchable photochromic windows and doors for the building according to embodiments of the present invention. Referring to FIG. 9, when a sun light is irradiated from the outsides of the photo switchable photochromic windows and doors for the car, only the short-wavelength light $\lambda_{on}$ is irradiated to the photochromic layers 12 and 22 by the short-wavelength transmission layers 14 and 24. Thus, the transmittance of the visible light of the photochromic layers 12 and 22 decreases, and the photo switchable photochromic windows and doors for the car block the sun light from the outside to function as a sunblind. When indoor light is irradiated to the photo switchable photochromic windows and doors for the car, only the long-wavelength light $\lambda_{off}$ is irradiated to the photochromic layers 12 and 22 by the wavelength conversion layer 16 or long-wavelength transmission layer 26. Thus, the transmittance of the visible light of the photochromic layers 12 and 22 increases and the photo switchable photochromic windows and doors for the car returns to a decolored state.

The photochromic glass according to embodiments of the present invention includes a photochromic layer.

Light having a particular wavelength may convert the transmittance of the photochromic layer. The wavelength region of an incident component may be adjusted by the short-wavelength transmission layer, wavelength conversion layer and long-wavelength transmission layer. When the wavelength of the incident component decreases, the transmittance of the visible light of the photochromic layer decreases. Incident short-wavelength light is limited to the short-wavelength transmission layer. Also, when the wavelength of the incident component increases, the transmittance of the visible light of the photochromic layer increases. Incident long-wavelength light is limited to the wavelength conversion layer or long-wavelength transmission layer. Thus, it is possible to adjust the transmittance of the photochromic layer according to the incident direction of light.

While embodiments of the present invention are described with reference to the accompanying drawings, a person skilled in the art may understand that the present invention may be practiced in other particular forms without changing technical spirits or essential characteristics. Therefore, embodiments described above should be understood as illustrative and not limitative in every aspect.

What is claimed is:

1. Photochromic material comprising:
   a photochromic layer having visible-light absorbance increased when an ultraviolet ray is irradiated, and having transmittance increased when a near infrared ray is irradiated;
   a short-wavelength transmission layer disposed on a first surface of the photo-chromic layer and having higher transmittance on short-wavelength light than long-wavelength light; and
   a wavelength conversion layer disposed on a second surface opposite to the first surface of the photochromic layer, and converting the short-wavelength light into long-wavelength light.

2. The photochromic material of claim 1, wherein the photo-chromic layer comprises azobenzene, spiro-naphtoxazine, naphtopyran, spiropyran, furylfulgide, stilbene, nitron, fulgide, triarylmethane, diarylethene, $MoO_x$, or $WO_x$.

3. The photochromic material of claim 1, wherein transmittance or reflectance of the short-wavelength transmission layer varies according to light entering a first surface of the short-wavelength transmission layer or light entering a second surface of the short-wavelength transmission layer opposite to the first surface of the short-wavelength transmission layer.

4. The photochromic material of claim 1, wherein the short-wavelength transmission layer has a thickness smaller than about 500 nm and comprises a transparent electrode material selected from ITO, ZnO:Al, ZnO:Ga, ZnO:B, $SnO_2$, ZnO, $TiO_2$ and $V_2O_5$.

5. The photochromic material of claim 1, wherein the short-wavelength transmission layer is a multi-layer photofunctional thin film having a thickness smaller than about 500 nm.

6. The photochromic material of claim 5, wherein the multi-layer photofunctional thin film comprises a dielectric selected from ITO, ZnO:Al, ZnO:Ga, ZnO:B, $SnO_2$, ZnO, $TiO_2$ and $V_2O_5$.

7. The photochromic material of claim 5, wherein the multi-layer photofunctional thin film comprises ultra-thin metal selected from silver (Ag), copper (Cu), aluminum (Al), gold (Au), platinum (Pt), zinc (Zn), chromium (Cr) and molybdenum (Mo).

8. The photochromic material of claim 1, wherein the wavelength conversion layer comprises an organic dye, lanthanide-based inorganic thin film, $TiO_x$ or $ZnO_x$.

* * * * *